United States Patent [19]

McGinniss

[11] 3,975,251

[45] Aug. 17, 1976

[54] CATHODIC ELECTROCOATING PROCESS
[75] Inventor: Vincent D. McGinniss, Valley City, Ohio
[73] Assignee: SCM Corporation, New York, N.Y.
[22] Filed: Mar. 19, 1975
[21] Appl. No.: 560,108

[52] U.S. Cl. .............................................. 204/181
[51] Int. Cl.² ................... C25D 13/10; C25D 13/06
[58] Field of Search ..................................... 204/181

[56] References Cited
UNITED STATES PATENTS
3,671,476  6/1972  Terai et al. ........................ 204/181
3,709,808  1/1973  Hammond .......................... 204/181

Primary Examiner—Howard S. Williams
Attorney, Agent, or Firm—Jerry K. Mueller, Jr.; Thomas M. Schmitz

[57] ABSTRACT

A heat-curable electrocoating composition containing a polymer having pendant amine groups and cross-linking agent having alpha-beta-ethylenically unsaturated carbonyl groups can be electrodeposited onto a cathode substrate disposed within an aqueous electrocoating bath. The amine groups of the polymer are protonated to render the polymer water-dispersible prior to electrodeposition. Upon electrodeposition onto the substrate, the amine groups become deprotonated and then cross-link with the alpha-beta-ethylenically unsaturated carbonyls upon heating to form a fully-cured electrodeposited coating on the cathode substrate.

2 Claims, No Drawings

CATHODIC ELECTROCOATING PROCESS

BACKGROUND OF THE INVENTION

This application is cross-referenced to the commonly assigned application of Vincent D. McGinniss, U.S. Ser. No. 519,409 entitled "Cathodic Electrocoating Composition and Process", filed on Oct. 31, 1974, the disclosure of which is expressly incorporated herein by reference.

This invention relates to electrodeposition of water-dispersed, heat-curable polymers onto a cathode substrate and more particularly to cross-linking amine groups on said electrodeposited polymers with a heat-reactive alpha-beta-ethylenically unsaturated carbonyl.

Several processes for electrodeposition of heat-curable electrocoating polymers onto a cathode substrate disposed in an aqueous electrocoating bath have been suggested. For example, U.S. Pat. No. 3,617,458 discloses an electrocoating epoxy polymer having pendant amine groups which are neutralized with an inorganic acid to render the polymer water soluble. The epoxy polymer also contains pendant carboxyl groups which cross-link with the epoxide (oxirane) groups of an epoxy resin upon heating to form a cured coating on the cathode substrate.

It now has been found that an alpha-beta-ethylenically unsaturated carbonyl cross-linking agent having at least two alpha-beta-ethylenically unsaturated groups cures a polymer which has been electrodeposited onto a cathode substrate. The electrocoating polymer contains pendant primary or secondary amine groups which are used both for rendering the polymer water soluble and for cross-linking with the alpha-beta-ethylenically unsaturated carbonyls.

SUMMARY OF THE INVENTION

The improved electrocoating composition for electrocoating onto a cathode substrate contains a polymer having pendant amine groups and a cross-linking agent in an aqueous disperson. The polymer has at least about 5% by weight pendant primary or secondary amine groups which are protonated with acid to render said polymer water dispersible in the water bath and are adapted to become de-protonated upon electrodeposition of said polymer on said cathode substrate. The electrocoating composition contains at least about 5% by weight of the polymer of alpha-beta-ethylenically unsaturated carbonyl cross-linking agent having at least two alpha-beta-ethylenically unsaturated groups. The unsaturated carbonyl groups cross-link upon heating with the electrocoated polymer by addition polymerization with said de-protonated pendant primary or secondary amine groups upon heating to form a heat-cured electrodeposited coating.

DETAILED DESCRIPTION OF THE INVENTION

The reaction mechanism by which cross-linking of the polymer through the unsaturated cross-linking agent occurs is an addition polymerization reaction, as more particularly described in "Organic Reactions," Vol. 10 (pages 179–555), John Wiley and sons (1959), which is incorporated expressly herein by reference. The Michael-type addition reacts a primary or secondary amine group with alpha-beta-ethylenically unsaturated carbon-carbon or carbonyl groups in order to achieve linking of the amine group and the carbon-carbon or carbonyl groups. The alpha-, beta-ethylenic unsaturation of alpha-, beta-ethylenically unsaturated carbonyl cross-linking agent is used in the instant invention.

The polymers contain pendant primary and/or secondary amine groups. Amine groups can be attached to the polymer by reacting free carboxyl groups on a polymer (polyester, acrylic, urethane, etc.) containing available carboxyl groups which can be reacted with alkyleneimine or substituted alkyleneimine, as proposed in U.S. Pat. No. 3,679,564, and U.S. Pat. No. 3,617,453, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer.

Blocked amines also can be attached to the polymer and subsequently transformed into primary amine groups. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer.

The primary and/or secondary amine groups are pendantly attached to the polymer. For purposed of this application, pendant amine groups include terminal amine groups. By pendantly attached is meant that such amine groups are attached to the polymer chain or to a side chain of the polymer.

The polymer containing pendant amine groups should contain at least about 5% by weight of such pendant amine groups, and up to about 50% if desired.

Representative polymers containing pendant amine groups can be derived from epoxy and epoxy-modified diglycidyl ethers of bis-phenol A structures, various aliphatic polyethylene or polypropylene glycol (diglycidyl ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are between about 500 and 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins.

Various other useful electrocoating polymers containing pendant amine groups can be advantageously employed in the electrocoating composition of this application as will become more apparent in the examples.

The amine groups of the polymer are protonated with proton donating acid to render the polymer water dispersible in the electrocoating bath. The amine groups also are adapted to become deprotonated during electrodeposition of the protonated polymer and the cross-linking agent onto the cathode substrate for cross-linking with the unsaturated cross-linking agent.

The cross-linking agent is an alpha-, beta-ethylenically unsaturated carbonyl having alpha-, beta-ethylenic unsaturation capable of being heat reactive to cross-link the amine groups on the polymer.

The unsaturated cross-linking agent has at least two pendantly attached alpha-, beta-ethylenically unsaturated carbonyl groups of the following structure:

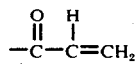

Each unsaturated carbonyl group is pendantly attached to a radical selected from the group consisting of an alkyl, an aryl, an alkyl-aryl, and polymers having a molecular weight up to about 3000. Pendantly attached unsaturated carbonyl groups are attached to the radical chain or to a side chain of the radical.

Preferably, the unsaturated carbonyl groups are attached to an oxygen molecule and are represented by the following structure:

The preferred unsaturated cross-linking agent then is a multi-acrylate having at least di-acrylic unsaturation.

Specific preferred cross-linking agents which are particularly suited to the precepts of this invention can be selected from the group consisting of: ethylene glycol diacrylate, ethylene glycol dimethacrylate, 1,3-butylene glycol dimethacrylate, bisphenol-A-dimethacrylate, diethylene glycol diacrylate, pentaerythritol triacrylate, pentaerythritol tetraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol-A-dimethacrylate, pentaerythritol tetramethacrylate, and polyethylene glycol dimethacrylate.

The preferred unsaturated cross-linking agents can be synthesized by various methods, such as reacting hydroxyl-containing compounds with acrylyl chlorides or methacrylyl chlorides, direct esterification of hydroxyl-containing compounds with ethylmethacrylate, methylmethacrylate and the like. The preferred unsaturated cross-linking agents also can be produced by the transesterification of esters or polyesters with 2-hydroxyethylacrylate, 2-hydroxyethylmethacrylate, hydroxypropylmethacrylate and the like.

The preferred unsaturated cross-linking agents can be produced additionally by reacting diisocyanates, polyisocyanates, or isocyanate-terminated polymers and prepolymers with hydroxyl-containing acrylic and methacrylic esters such as for example, 2-hydroxyethylacrylate or hydroxyproplymethacrylate; by reacting epoxy polymers with acrylic acids or methacrylic acids; and by reacting carboxyl containing compounds with glycidyl acrylates or glycidyl methacrylates.

In practicing this invention, the polymer is rendered water soluble by adding sufficient proton-donating acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all (primary, secondary and tertiary if there be any) amine groups of the polymer by the acid.

Protonating of the amine groups of the polymer renders the polymer positively-charged so that the polymer can migrate to the cathode substrate and be deposited thereon during the electrodeposition. While the pendant primary and/or secondary groups of the polymer are protonated, such amine groups will not react with the unsaturated cross-linking agent as the polymer is stable in water. A polymer having blocked amine groups can be treated with a proton-donating acid in water in order to protonate all amine groups for water solubility of the polymer and to remove the blocking group from the pendant amine groups in order to convert such tertiary amine groups into protonated primary amine groups.

The neutralized polymer is blended with at least about 5% of said unsaturated cross-linking agent by weight of the polymer and up to about 50% if desired. The blend is then dispersed in water to form the electrocoating bath of from about 5 to 20% non-volatile dispersion. The bath is generally at about 60° to about 125°F, with about 70° to about 95°F being preferred.

The neutralized (protonated) polymer and unsaturated cross-linking agent are both stable in the bath and no interreaction there occurs. The cathode substrate to be electrocoated is then immersed in the electrocoating bath while an electric potential is maintained therethrough as disclosed in U.S. Pat. No. 3,619,398, the same being incorporated herein by reference. During electrodeposition the positively charged polymer along with the unsaturated cross-linking agent migrate to the cathode substrate. The protonated amine groups of the polymer become deprotonated (lose protons) due to the electric potential applied. The polymer and said unsaturated cross-linking agent are codeposited on the cathode substrate. The electric potential applied to the bath is generally between about 20 and about 500 volts, with about 50 to 300 volts being preferred.

The coated substrate is removed from the bath, washed with water to remove excess coating, and then conventionally heat-cured at a temperature of at least about 100° and preferably between about 200° and 400°F for about 5 to about 40 minutes. The polymer cross-links through the de-protonated pendant primary and/or secondary amine groups attached to the electrocoated polymer. Water solubility and cross-linking of the polymer both occur through the same pendant amine groups of the polymer. The alpha-, beta-ethylenic unsaturation of the unsaturated cross-linking agent is heat-reactive under the conditions of curing and readily reacts with the pendant amine groups of the polymer in Michale-type addition reaction or addition polymerization. Upon such heating a fully-cured electrodeposited coating coats the cathode substrate.

The electrocoating composition can contain opacifying pigments and inert extenders such as, for example, titanium dioxide, zinc oxide, clays such as kaolinite clays, silica, talc, and the like.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes.

The following examples further detail the unsaturated cross-linking agents of the instant invention and show how the instant invention can be practiced, but should not be construed as limiting the invention. In the specification all parts are by weight, all percentages are weight percentages, and all temperatures are in degrees Fahrenheit unless otherwise expressly indicated.

EXAMPLE 1

One mole of DER 332 epoxy resin (Dow Epoxy Resin, epoxide equivalent weight 172–196, Chemical Company) was reacted with two moles of cyclohexyl amine in butyl cellulose in order to attach pendant amine groups to the epoxy resin. The resin was completely neutralized with 2 moles of acetic acid. The unsaturated cross-linking agent was pentaerythritoltetraacrylate. The resin was blended with 100 grams of the pentaerythritoltetraacrylate cross-linking agent and added to water to form a 7% non-volatile dispersion.

A steel panel was immersed in the bath as the cathode and the electrocoating composition was electrodeposited therein at 50 volts for 2 minutes to form a coating of 0.4 mils. The coated panel was removed from the bath, washed with water, and baked at 360°F for 15 minutes. A solvent-resistant coating covered the panel indicating that curing had taken place.

EXAMPLE 2

A polyester resin was prepared by reacting one mole of phthalic anhydride, one mole of succinic anhydride, and one mole of propylene glycol. Such reaction was carried out in toluene with azeotropic distillation of water. This reaction product, an acid-terminated polyester, then was reacted with two moles of hexamethylene diamine and the water removed to form a diamine-terminated polyester resin.

The amine resin next was completely neutralized with 6 moles of acetic acid and blended with 20% by weight of melamine acrylate cross-linking agent. The blend was added to demineralized water to form a 10% non-volatile dispersion. A steel panel then was cathodically electrocoated in the electrocoating bath to form an 0.8 mil coating, washed with water, and baked at 250°F. for 40 minutes. Again, a fully-cured electrodeposited coating covered the panel.

EXAMPLE 3

A polyamide resin was formulated by reacting one mole of succinic anhydride with two moles of hexamethylene diamine in toluene with removal of water by azeotropic distillation.

The diamine resin then was completely neutralized with 2.5 moles of acetic acid. The neutralized polymer was blended with 20% by weight of the diacrylate of DER 332 epoxy resin unsaturated cross-linking agent and this blend added to water to form a 10% non-volatile dispersion. A steel panel was cathodically electrocoated to 0.6 mils, washed with water and baked at 360°F, for 30 minutes. A fully-cured electrodeposited coating covered the panel upon such baking.

EXAMPLE 4

One mole of an epoxy resin (DER 664, epoxy equivalent weight of 900, Dow Epoxy Resin, Dow Chemical Company), was reacted at 60°C with two moles of the ketimine blocked diethylene triamine of the specification,

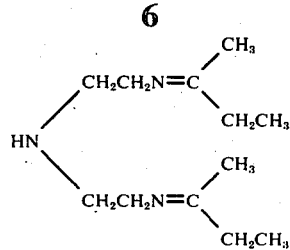

completely neutralized with 4 moles of lactic acid, and blended with 20% of 1,6 hexanedioldiacrylate cross-linking agent. The blend was then added to deionized water to form a 7% non-volatile (solids) dispersion.

This electrocoating composition was cathodically electrodeposited at 100 volts for one minute onto steel panels to 1.0 mil. The panels then were removed from the bath, washed with water, and baked at 300°F. for 30 minutes. A hard, flexible, solvent-resistant coating covered the steel panel.

EXAMPLE 5

The procedure of Example 4 was followed except that the 1,6 hexanedioldiacrylate was omitted from the blend. The electrocoated steel panels upon baking did not have a solvent-resistant coating thereon, indicating that the electrocoating had not cured.

EXAMPLE 6

An acrylic resin was synthesized by the solution polymerization of 30% ethylacrylate, 20% styrene, 30% butyl acrylate, and 20% glycidyl methacrylate. This reaction was run under standard solution acrylic polymerization conditions using butyl cellosolve as the solvent and azobisisobutyl nitrile as the initiator.

The solution acrylic polymer contained pendant oxirane groups. The solution acrylic polymer was reacted with 15% of the ketimine blocked diethylene triamine of Example 4 to form an acrylic resin with pendant amine groups.

The amine-acrylic resin then was completely neutralized with 4 moles of lactic acid, blended with 20% trimethylolpropane triacrylate cross-linking agent and added to water to form an 8% non-volatile dispersion.

This electrocoating composition was cathodically electrodeposited onto steel panels to 0.4 mils in a manner similar to Example 4, washed with water, and baked at 400°F. for 25 minutes. A hard, flexible, fully-cured, solvent-resistant coating covered the panels.

EXAMPLE 7

A urethane resin was synthesized from the reaction of two moles of toluenediisocyanate and one mole of ethylene glycol. The diisocyanate-terminated resin was then reacted with two moles of the ketimine blocked diethylene triamine of Example 4. The amine resin was completely neutralized with 4 moles lactic acid and blended with 15% of the reaction product of one mole of toluenediisocyanate with two moles of 2-hydroxyethylacrylate (unsaturated cross-linking agent). The electrocoating bath was formed by adding the resin and said unsaturated cross-linking agent to water to form an 8% non-volatile dispersion.

The blend was cathodically electrodeposited onto a steel panel at 100 volts for 2 minutes to 1.0 mils. The steel panel was then removed from the bath, washed with water, and baked at 400°F. for 10 minutes. A fully-cured electrodeposited coating covered the panel.

EXAMPLE 8

A polymer-diacrylate cross-linking agent was prepared by reacting 2 moles of succinic anhydride with 1 mole of polyoxyethylene glycol (molecular weight of 1540), which reaction product was further reacted with 2 moles of glycidyl acrylate.

One mole of the epoxy resin of Example 4 (DER 664) was reacted at 60°C with 2 moles of the ketimine blocked diethylene triamine of Example 4 followed by further reaction with one mole of linseed oil fatty acid. This resin was completely neutralized with 4 moles of acetic acid and blended with 50% polyetherdiacrylate cross-linking agent by weight of the resin. The blend was added to deionized water to form an 8% non-volatile dispersion.

This electrocoating composition was cathodically electrodeposited at 100 volts for 1 minute onto a steel panel to 0.6 mils. The panel was removed from the bath, washed with water, and baked at 400°F. for 35 minutes. A hard, flexible, solvent-resistant coating covered the panel.

EXAMPLE 9

The neutralized resin of Example 8 (unsaturated oil-modified epoxy resin neutralized with acetic acid) was blended with 20% by weight unsaturated cross-linking agent produced by the transesterfication of dimethylterephthalate with excess 2-hydroxyethyl acrylate. The blend was added to deionized water to form an 8% non-volatile dispersion.

This electrocoating composition was cathodically electrocoated to 0.4 mils and baked in a manner similar to Example 8. A hard, flexible, solvent-resistant coating covered the panel.

I claim:
1. In a process for electrodeposition of a heat-curable electrocoating composition containing a polymer having pendant amine groups and a cross-linking agent in an aqueous dispersion onto a cathode substrate disposed within an aqueous electrocoating bath, said polymer being cross-linkable upon subsequent heating of said electrocoated cathode substrate, the improvement comprising:
   a. providing said electrocoating composition containing
      i. a polymer having at least about 5% by weight pendant primary or secondary amine groups, said amine groups being protonated with acid to render said polymer water dispersible in said bath; and
      ii. at least about 5% by weight of said polymer of alpha-, beta-ethylenically unsaturated carbonyl cross-linking agent having at least two alpha-, beta-ethylenically unsaturated carbonyl groups;
   b. applying an electromotive potential through said bath to electrodeposit said polymer and said cross-linking agent onto said cathode substrate, whereby said pendant amine groups of said polymer become de-protonated; and
   c. heating said electrocoated cathode substrate to cross-link said polymer by addition polymerization of said cross-linking agent with said de-protonated pendant amine groups to form a heat-cured electrodeposited coating.

2. The electrodeposition process of claim 1, wherein said heating said electrocoated cathode substrate is at a temperature of at least about 100°F.

* * * * *